United States Patent [19]

Lawford et al.

[11] 4,330,464
[45] May 18, 1982

[54] ISOLATION OF MICROBIAL PROTEIN WITH REDUCED NUCLEIC ACID CONTENT

[75] Inventors: George R. Lawford, Hamilton; Peter N. Lewis, Islington, both of Canada

[73] Assignee: George Weston Limited, Toronto, Canada

[21] Appl. No.: 281,632

[22] Filed: Jul. 9, 1981

[51] Int. Cl.³ .............................................. A23J 1/18
[52] U.S. Cl. .................................. 260/112 R; 426/656
[58] Field of Search .................................... 260/112 R

[56] References Cited

U.S. PATENT DOCUMENTS

| | | | |
|---|---|---|---|
| 3,725,075 | 4/1973 | Muroi et al. | 260/112 R X |
| 3,867,255 | 2/1975 | Newell et al. | 260/112 R X |
| 3,867,555 | 2/1975 | Newell et al. | 260/112 R X |
| 3,887,431 | 6/1975 | Robbins et al. | 260/112 R X |
| 3,991,215 | 11/1976 | Robbins | 260/112 R X |
| 4,072,667 | 2/1978 | Ishida et al. | 260/112 R |
| 4,123,426 | 10/1978 | Katayama et al. | 260/112 R |
| 4,135,000 | 1/1979 | Schulpt, Jr. | 260/112 R X |
| 4,168,262 | 9/1979 | Kinsella et al. | 260/112 R |

*Primary Examiner*—Howard E. Schain
*Attorney, Agent, or Firm*—Rogers, Bereskin & Parr

[57] ABSTRACT

The present invention relates to a process for the isolation of protein from microbial cells. The microbial cells are subjected to a treatment to disrupt the cell walls thereby producing a cellular debris fraction and a fraction containing protein and nucleic acid. The two fractions are separated and the fraction containing the protein and nucleic acid is treated with a chelating agent at a pH in the range of 5.5 to 7.0. The resulting solution is passed through an anion exchange column which selectively adsorbs the nucleic acid. The protein is recovered from the resultant eluate.

10 Claims, No Drawings

ISOLATION OF MICROBIAL PROTEIN WITH REDUCED NUCLEIC ACID CONTENT

The present invention relates to a process for the isolation of a high quality protein from microbial cells. The protein may be used as an additive to enrich the protein quality of food for human consumption.

Microbial cells have a high nucleic acid content, primarily ribonucleic acid (RNA). The content may be up to 18% which makes these cells unsuitable for human consumption. One of the end-products of nucleic acid metabolism is uric acid, and man does not possess the enzyme uricase which catalyzes the oxidation of uric acid to the more soluble allantoin. High plasma levels of uric acid can lead to precipitation of uric acid crystals in the joints (gout), soft tissues (tophi) or to the formation of stones in the urinary tract. In order to to avoid such problems, the intake of nucleic acid from microbial sources should not exceed two grams per day, as recommended by the Protein Advisory Group of the United Nations. If microbial protein is to be a substantial source of protein in the human diet, perhaps 25 grams per day, which would be equivalent to about half the recommended daily allowance of protein for an adult, then the protein:RNA ratio in such a product should be at least 12:1.

Various processes have been developed to reduce the nucleic acid content of single cell protein. Some methods involve keeping the whole cells intact and either extracting RNA or allowing the degradation products of RNA digestion to leak out of the cell walls. However, by leaving the protein within the cell walls, the nutritional value is greatly reduced. Disintegration of the cells by any one of the common methods results in a cellular debris fraction and a soluble cytoplasmic constituent fraction which includes both the protein and the nucleic acid. Some of these methods for recovering the protein with a reduced amount of associated RNA include endogenous or exogenous ribonuclease treatments to digest RNA, heat treatment at a temperature over 100° C. to insolubilize the protein or alkaline hydrolysis to hydrolyze the RNA. The harsh conditions of some of these treatments result in irreversibly insoluble products in which the protein is considerably denatured.

It has now been found that it is possible to treat the fraction containing protein and nucleic acid in such a manner that the resultant protein is recovered in a more useful form.

Accordingly, the present invention provides a process for isolation of protein from microbial cells in which the microbial cells are subjected to a treatment to disrupt the cell walls thereby producing a cellular debris fraction and a fraction containing protein and nucleic acid, the two fractions are separated, the fraction containing the protein and nucleic acid is treated with a chelating agent at a pH in the range of from 5.5 to 7.0, the resultant solution is passed over an anion exchange resin which selectively adsorbs the nucleic acid and the resultant eluate is collected.

The microbial cells for use in the process in the present invention are either cells which are newly grown in a fermentation process or cellular material isolated as a by-product of an industrial process such a brewer's yeast from the brewing plant. Suitable cells are those which may be obtained from Candida utilis, Saccharomyces cerevisiae Saccharomyces carlsbergensis or Zymomonas mobilis.

The chelating agents which are useful for the practice of the present invention are those which are active in the pH range of 5.5 to 7.0. Suitable chelating agents according to the present invention are citric acid or the salts thereof, or ethylenediaminetetraacetic acid (EDTA) or the salts thereof.

The pH may be between 5.5 and 7.0. The lower limit of the pH is determined by the fact that isoelectric precipitation of protein takes place below 5.5 for most yeast proteins. Different proteins may have different isoelectric points. If the column is washed with the same buffer in which it is equilibrated, it will be found that the sample passing directly through the column combined with any washing contains approximately 40 to 65% of the protein originally applied and 0.5 to 5.0% of the RNA originally applied. In most cases less than 2% of the originally applied RNA is recovered but up to 5% or even higher is acceptable to make the protein:RNA ratio higher than the minimum 12:1.

Suitable anion exchanger resins for the practice of the present invention are those which selectively adsorb nucleic acid. Examples of such resins are DEAE cellulose or ECTEOLA cellulose.

The microbial cells, in a slurry of suitable concentration, may be disrupted by the use of any of the common methods, such as high pressure homogenization, milling, sonic disintegration, lytic enzymes and the like. The disintegrated cell slurry may be fractionated by centrifugation or filtration into a fraction containing unbroken cells together with cell wall fragments and a soluble extract. The extract is the fraction containing the protein and nucleic acid and has a protein:RNA ratio in the range of approximately 2:1 to 5:1, depending on the history of the cells. The extract is then treated with a buffer containing a chelating agent. It will be apparent to one skilled in the art that the minimum concentration of the chelating agent will depend on its activity. For each one mg/ml of protein in the extract, the concentration of citrate ions, for example, should be at least 2 mM. The chelating compounds may be present in the homogenizing buffer or may be introduced later, either before or after removal of the cellular debris.

The extract is then applied to a column of an appropriate anion exchanger.

In order to improve the protein yield, the anion exchanger may be eluted with the same buffer containing in addition a salt, such as sodium chloride or potassium chloride at a concentration up to 0.3 M. A further 4 to 16% of the protein and less than 1% of the RNA originally applied may be eluted. At salt concentrations higher than 0.3 M, a significant amount of RNA is eluted from the column. The distribution of protein recovery between the two fractions, i.e. the unbound and the salt elution, may vary with changing buffer concentrations but the combined recovery is usually 55 to 70% of the original protein and less than 2% of the original RNA. Thus, the protein:RNA is generally increased by a factor of at least 25. The column may be regenerated for further use by passing sodium hydroxide through the used column, followed by reequilibration with the required buffer.

The effluent from the column may be desalted, for example by dialysis and dried to obtain the product. This product has been found to contain 55 to 80% protein, with the remainder being mostly carbohydrate. The product has been found to be completely water soluble at or above pH 7 which indicates that the protein is not denatured. Since protein solubility is a functional property that frequently predicts other functional properties of proteinaceous materials in food systems, this product is of good quality for use as an additive to enrich the protein quality of food. The amino acid profiles of microbial proteins are generally high in lysine and low in the sulphur-containing amino acids, cysteine and methionine. One potential application would be to add microbial protein to cellular products which have proteins high in cysteine and methionine and low in lysine, resulting in a food product with a good balance of amino acids.

EXAMPLE 1

Candida utilis (NRRL Y-900) was grown in continuous culture in a chemostat of 9.5 L working volume at a dilution rate of approximately 0.4 $hr^{-1}$, on a molasses plus minimal salts medium. About 5 liters of effluent was collected into a refrigerated vessel, centrifuged at 3000 g, washed with cold water and frozen. This cream was later thawed and suspended in 0.01 M sodium phosphate, pH 6.5 to a volume of 200 ml to obtain a slurry at 10% (w/v) yeast (dry weight basis). The slurry was passed through a Gaulin Laboratory Homogenizer (Model 15M-8TA, equipped with a cell disintegration valve) at a pressure of 10,000 psi. The homogenate was divided into three portions, making no additions to one portion and adding sodium citrate to attain a citrate ion concentration of 0.08 M to another portion, and EDTA at 0.25 mM to the third, all at pH 6.5. The three samples were centrifuged at 5800 g for 10 minutes and the soluble extracts were decanted from the cellular debris.

Three columns of approximately 10 ml volume had been prepared by equilibrating in the corresponding buffers for each of the above extracts the anion exchange cellulose Cellex E (ECTEOLA Cellulose, Bio-Rad Laboratories). The extract was applied to each column at about 40% of the RNA-binding capacity, followed by one column volume of buffer wash, then two column volumes of 0.2 M NaCl in the appropriate buffer.

The results are shown in Table 1.

TABLE 1

| Extract | Protein: RNA Ratio in Extract | % of Protein Recovered | % of RNA Recovered | Increase in Protein:RNA Ratio | Protein: RNA Ratio |
|---|---|---|---|---|---|
| no additions | 2.0:1 | 67.0% | 23.8% | 2.8X | 5.6:1 |
| 0.25mM EDTA | 2.0:1 | 60.9% | 4.6% | 13X | 26:1 |
| 0.08M Citrate | 1.8:1 | 63.8% | 1.0% | 64X | 115:1 |

EXAMPLE 2

Candida utilis was grown and harvested as in Example 1. A suspension of freshly grown yeast was homogenized in 0.01 M sodium phosphate at pH 6.2 as in Example 1. Sodium citrate and sodium pyrophosphate were added to portions of the homogenate in increasing amounts, then each was centrifuged at 5800 g for 10 minutes. Three columns of Cellex E with volumes of about 5 ml were equilibrated in buffers corresponding to those of the extracts. Each was loaded with extract, at about 80% of the RNA-binding capacity, washed with one column volume of buffer, followed by three column volumes of 0.2 M sodium chloride in the appropriate buffer.

The results are shown in Table 2.

TABLE 2

| Extract | Protein:RNA Ratio in Extract | % of Protein Recovered | % of RNA Recovered | Increase in Protein: RNA Ratio | Protein: RNA Ratio |
|---|---|---|---|---|---|
| .02M citrate + .0025M pyrophosphate | 2.4:1 | 65.3% | 9.7% | 6.7X | 16:1 |
| .04M citrate + .005M pyrophosphate | 2.0:1 | 62.9% | 3.2% | 20X | 40:1 |
| .08M citrate + .01M pyrophosphate | 1.8:1 | 64.0% | 2.8% | 23X | 41:1 |

EXAMPLE 3

Candida utilis was grown and harvested as in Example 1. The cells were suspended in 0.08 M sodium citrate, 0.01 M sodium pyrophosphate, 0.01 M sodium phosphate, at pH 6.2 and homogenized as in Example 1. Portions of the homogenate were adjusted to various pH values, then centrifuged at 5800 g, for 10 minutes. The extracts were then applied to columns of Cellex E equilibrated in the same buffer at the various pH values and eluted as in Example 1.

The results are shown in Table 3.

TABLE 3

| pH | % of Protein Recovered | % of RNA Recovered | Increase in Protein:RNA Ratio |
|---|---|---|---|
| 5.0* | 77.3% | 4.8% | 16X |
| 5.6 | 54.1% | 2.2% | 25X |
| 5.9 | 54.1% | 1.6% | 36X |
| 6.0 | 58.4% | 1.0% | 58X |
| 6.2 | 59.2% | 1.1% | 54X |
| 6.5 | 59.5% | 0.9% | 66X |
| 6.8 | 59.0% | 1.9% | 31X |
| 8.0 | 60.7% | 24.4% | 2.5X |

*This was a dilute extract as pH adjustment caused 56% of the protein and 70% of the RNA to precipitate out.

EXAMPLE 4

Candida utilis was freshly grown and harvested as in Example 1. The yeast was suspended in buffer containing 0.04 M sodium citrate, 0.005 M sodium pyrophosphate, 0.01 M sodium phosphate at pH 6.2 and homogenized as in Example 1. The homogenate was centrifuged at 5800 g, for 10 minutes and the extract was loaded on a column of Cellex E with a 44 ml bed volume, at approximately 90% of the RNA-binding capacity. After the sample had flowed into the column it was washed with one column volume of buffer, followed by two column volumes of 0.2 M NaCl in the same buffer. Fractions of 10 ml were collected and were assayed for protein and RNA. The recoveries were as shown in Table 4.

TABLE 4

| Fraction No. | | Protein (mg) | Protein Recovery (Cumulative) | RNA (mg) | RNA Recovery (cumulative) |
|---|---|---|---|---|---|
| Unbound | 1 | 80.1 | 17.7% | 0.51 | 0.20% |
| | 2 | 97.6 | 38.9% | 0.78 | 0.53% |
| | 3 | 40.6 | 47.7% | 0.99 | 0.92% |
| | 4 | 16.7 | 51.4% | 0.89 | 1.26% |

TABLE 4-continued

| Fraction No. | | Protein (mg) | Protein Recovery (Cumulative) | RNA (mg) | RNA Recovery (cumulative) |
|---|---|---|---|---|---|
| | 5 | 6.6 | 52.8% | 0.83 | 1.54% |
| | 6 | 4.0 | 53.7% | 0.48 | 1.77% |
| | 7 | 4.6 | 54.7% | 0.25 | 1.87% |
| Salt | 8 | 8.7 | 56.6% | 0.25 | 1.96% |
| Elution | 9 | 7.1 | 58.1% | 0.12 | 2.01% |
| | 10 | 4.6 | 59.1% | 0.03 | 2.02% |
| | 11 | 2.7 | 59.7% | 0.0 | 2.02% |
| | 12 | 2.0 | 60.2% | 0.01 | 2.03% |

EXAMPLE 5

An extract was prepared, as in Example 1 from frozen yeast cream, and homogenized in 0.01 M sodium phosphate at pH 6.5. Sodium citrate (0.08) was added to the homogenate and it was centrifuged at 5800 g for 10 minutes to obtain the extract. Two columns of approximately 8 ml volumes were prepared using two different anion exchange celluloses, one with Cellex E as in previous examples and one with Cellex D (DEAE cellulose, Bio-Rad Laboratories). A sample was loaded on each at about 45% of the RNA-binding capacity. The columns were washed with one volume buffer followed by two volumes of 0.2 M NaCl in the same buffer, all at pH 6.5. On the Cellex E column, 63.8% of the originally applied protein and 1.0% of the originally applied RNA were recovered. On the Cellex D column, 62.1% of the originally applied protein and 1.3% of the originally applied RNA were recovered.

EXAMPLE 6

A sample of commercial Baker's Yeast (Saccharomyces cerevisiae) was suspended in buffer containing 0.08 M sodium citrate, 0.01 M sodium pyrophosphate at pH 6.2 at a cell cencentration of approximately 10% (w/v, dry weight basis). This was homogenized and centrifuged as in Example 1 to obtain an extract with a protein:RNA ratio of 4.1. A portion of the extract was loaded onto a column of Cellex E equilibrated in the same buffer at approximately 70% of the RNA-binding capacity and washed with one column volume of buffer.

The fraction which passed directly through combined with the washing contained 66.5% of the original protein and 3.3% of the original RNA. Elution with two column volumes of 0.2 M NaCl in the same buffer, resulted in the recovery of a further 3.6% of the original protein and 0.7% of the original RNA. The combined recovery in these two fractions was 70.1% of the original protein and 4.0% of the original RNA, for an increase in the protein:RNA ratio by a factor of 17.5 to a ratio of 72:1. Elution with two column volumes of 0.4 M NaCl in the same buffer resulted in the recovery of a further 1.5% of the original protein and 14.0% of the original RNA.

EXAMPLE 7

Saccharomyces carlsbergensis was grown as a batch on a molasses plus complete salts medium. Approximately five hours after growth had ceased, the cells were harvested, centrifuged, washed and then suspended in a buffer containing 0.08 M sodium citrate, 0.01 M sodium pyrophosphate, 0.01 M sodium phosphate at pH 6.5 at a concentration of approximately 10% (w/v, dry weight basis). This slurry was homogenized as in Example 1. The extract obtained on centrifuging had a protein:RNA ratio of 2.9:1 and was applied to a column of Cellex D, at approximately 70% of the RNA-binding capacity. The column was washed with one volume of buffer, followed by two volumes of 0.2 M NaCl in buffer, resulting in the recovery of 74.1% of the original protein and 6.2% of the original RNA, for an increase in protein:RNA ratio by a factor of 12 to a ratio of 35:1.

EXAMPLE 8

The bacterium Zymomonas mobilis (ATCC 29191) was grown in continuous culture on a medium of glucose, yeast extract and salts. About 700 ml of culture was collected onto ice, centrifuged and washed. Ten grams of cell cream, and 10 ml of buffer containing 0.04 M sodium citrate, 0.005 M sodium pyrophosphate, 0.005 M sodium phosphate at pH 6.2 were placed in a Braun homogenizer flask with 50 g glass beads (0.25–0.3 mm). This was homogenized for 2 pulses of 30 sec at 4000 cycles per minute, with a flow of liquid $CO_2$ for cooling. The contents of the flask were decanted and the flask and beads were rinsed with two 10 ml portions of buffer. The combined homogenate and washings were centrifuged at 5800 g for 10 minutes to obtain a soluble extract with a protein:RNA ratio of 1.5:1. This was applied to a column of Cellex E, which was washed with one column volume of buffer. The sample passing through the column contained 59.3% of the original protein and 2.0% of the original RNA, for an increase in the protein:RNA ratio by factor of 30 to a ratio of 45:1.

We claim:

1. A process for the isolation of protein from microbial cells in which the microbial cells are subjected to a treatment to disrupt the cell walls thereby producing a cellular debris fraction and a fraction containing protein and nucleic acid, the two fractions are separated, the fraction containing the protein and nucleic acid is treated with a chelating agent at a pH in the range of from 5.5 to 7.0, the resultant solution is passed over an anion exchange resin which selectively adsorbs the nucleic acid and the resultant eluate is collected.

2. A process as claimed in claim 1 in which the chelating agent is citric acid or a salt thereof.

3. A process as claimed in claim 1 in which the chelating agent is ethylenediaminetetraacetic acid or a salt thereof.

4. A process as claimed in claim 1, claim 2 or claim 3 in which the cells are derived from Canadida utilis.

5. A process as claimed in claim 1, claim 2 or claim 3 in which the cells are derived from Saccharomyces cerevisiae.

6. A process as claimed in claim 1, claim 2 or claim 3 in which the cells are derived from Zymomonas mobilis.

7. A process as claimed in claim 1, claim 2 or claim 3 in which the cells are derived from Saccharomyces carlsbergensis.

8. A process as claimed in claim 1 in which the pH is in the range of from 6 to 6.5.

9. A process as claimed in claim 1, claim 2 or claim 3 in which the eluate is dried.

10. A process as claimed in claim 1, claim 2 or claim 3 in which the eluate is desalted and then dried.

* * * * *